(12) United States Patent
Robbins et al.

(10) Patent No.: US 8,141,816 B2
(45) Date of Patent: Mar. 27, 2012

(54) AFT INLET DUCT MOUNTED DOOR ACTUATOR

(75) Inventors: Robert Robbins, Chandler, AZ (US);
Vincent Doras, Mesa, AZ (US); Adam Kowal, Mesa, AZ (US); Reha Gomuc, Phoenix, AZ (US); Tony Brett, Beaconsfield, AZ (US); Larry Reese, Phoenix, AZ (US); Steve Harper, Chandler, AZ (US); Marc Schmittenberg, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1261 days.

(21) Appl. No.: 12/112,711

(22) Filed: Apr. 30, 2008

(65) Prior Publication Data
US 2009/0272847 A1    Nov. 5, 2009

(51) Int. Cl.
*B64D 33/00* (2006.01)
*B64C 1/14* (2006.01)

(52) U.S. Cl. .................................. 244/53 B; 244/129.4

(58) Field of Classification Search ................ 244/53 B, 244/110 B, 129.4, 129.5; 60/270.1; 49/104, 49/109, 381
See application file for complete search history.

(56) References Cited

U.S. PATENT DOCUMENTS

| 2,297,969 | A  | * | 10/1942 | Matheson ...................... 126/340 |
| 6,264,137 | B1 | * | 7/2001  | Sheoran ....................... 244/53 B |
| 6,349,899 | B1 | * | 2/2002  | Ralston ........................ 244/53 B |
| 6,457,675 | B1 | * | 10/2002 | Plude et al. ................ 244/129.5 |
| 7,210,652 | B2 |   | 5/2007  | Hein et al |
| 7,222,819 | B1 |   | 5/2007  | Kelnhofer |
| 2006/0102781 | A1 | * | 5/2006 | Hein et al. ....................... 244/58 |

* cited by examiner

*Primary Examiner* — Tien Dinh
(74) *Attorney, Agent, or Firm* — Ingrassia Fisher & Lorenz, P.C.

(57) ABSTRACT

An inlet door system including an aft inlet duct mounted door actuator providing RAM air to an auxiliary power unit (APU) contained within an aircraft is provided. The inlet door system includes an inlet duct, the aft inlet duct mounted door actuator, and a door. The inlet duct is configured to extend from the auxiliary power unit to the aircraft housing and has a sidewall that defines a flow passage. The door actuator is mounted to an exterior surface of the aft portion of the inlet duct. The door is coupled to the actuator. The actuator is configured to selectively rotate the door between at least a first position and a second position.

6 Claims, 4 Drawing Sheets

AFT INLET DUCT MOUNTED DOOR ACTUATOR

TECHNICAL FIELD

The present invention relates to aircraft inlet doors, and more particularly, the actuation of inlet doors of an auxiliary power unit.

BACKGROUND

Auxiliary power units ("APU") are used in aircraft to provide electrical power and compressed air to various aircraft systems and components. When an aircraft is on the ground, its main source of electrical power and cabin conditioning comes from the APU. In particular, the APU can power the environmental control systems, air drive hydraulic pumps, and the starters for the engines. When an aircraft is in flight, the APU may provide pneumatic and/or electric power to the aircraft.

Typically, APUs are located in the aft section of the aircraft, at or near the tailcone section and include inlet and exhaust ducting that exit through an opening, or cut-out, in the aircraft fuselage to allow sufficient air flow through to the APU. For aircraft on which APUs operate during flight, a RAM air door is typically provided to protect the APU from foreign object damage when not in use and/or during ground movement, and to maximize airflow into the APU when performance or oil cooling at altitude is required. Thus, when the APU is running, the RAM air door opens, either on the ground or in flight. Typically in such configuration, the RAM air door is configured to open approximately 20-45 degrees during a flight phase of operation and in many cases approximately 70 degrees, or fully open, such as during a ground phase of operation full open (70 degrees) on ground, relative to the aircraft fuselage. This allows for noise reduction on the ground, while optimizing RAM recover for the APU performance in flight with minimal drag to the aircraft.

In many conventional aircraft types, the actuation of the RAM air door is achieved by mounting an actuating device proximate the RAM air door. In most instances, the actuator is mounted to an interior surface of the inlet duct and coupled to the side or front of the inlet door. The positioning and mounting location of the actuator may affect aerodynamic performance of the door and may affect acoustic treatment performance of the inlet duct. In many instances, the actuator, and more particularly the actuator rod, may extend into the flow of air in the inlet duct disrupting the aerodynamic performance. In addition, the mounting location of the actuator may impact accessibility of the actuator for maintenance, repair and replacement purposes.

Therefore, there is a need for a RAM air door actuator that minimizes disruption to the aerodynamic performance of the RAM air inlet door to which it is coupled and minimizes acoustic treatment performance on the inlet duct. In addition, there is a need for a RAM air door actuator that provides maintenance access from inside the APU compartment for the purpose of repairing and/or replacing the actuator. The present invention addresses one or more of these needs.

BRIEF SUMMARY

The present invention provides an inlet door system for an auxiliary power unit (APU) contained within an aircraft. On one specific embodiment, and by way of example only, provides is an inlet door system providing RAM air to an auxiliary power unit (APU) contained within an aircraft. The inlet door system includes a duct configured to extend from the auxiliary power unit (APU) to an intake opening formed in an outer surface of the aircraft. The duct having an inlet port, an outlet port, and a duct sidewall extending from the inlet port to the outlet port. The duct sidewall defining an air flow passage therebetween the inlet port and the outlet port. Further included is a door rotationally positioned to sealingly engage with the inlet port and configured to selectively rotate between at least a first position and a second position. An actuator is coupled to the door and mounted to an exterior surface of an aft portion of the duct. The actuator is configured to rotate the door to at least the first position and the second position without impacting the air flow passage.

In yet another embodiment, and by way of example only, provided is an inlet door system providing RAM air to an auxiliary power unit (APU) contained within an aircraft. The inlet door system includes an inlet duct configured to extend from the auxiliary power unit (APU) to an intake opening formed in an outer surface of the aircraft. The duct having an inlet port, an outlet port, and a duct sidewall extending from the inlet port to the outlet port. The duct sidewall defining an air flow passage therebetween the inlet port and the outlet port. The inlet door system further includes a door rotationally positioned to sealingly engage with the inlet port and configured to selectively rotate between at least a first position and a second position. An actuator is coupled to the door and mounted to an exterior surface of an aft portion of the inlet duct via a mounting bracket. The actuator is configured to provide symmetrical door loading while rotating the door to at least the first position and the second position without impacting the air flow passage.

In still another embodiment, and by way of example only, provided is an inlet door system providing RAM air to an auxiliary power unit (APU) contained within an aircraft. The inlet door system includes an inlet duct configured to extend from the auxiliary power unit (APU) to an intake opening formed in an outer surface of the aircraft. The duct having an inlet port, an outlet port, and a duct sidewall extending from the inlet port to the outlet port. The duct sidewall defining an air flow passage therebetween the inlet port and the outlet port. The system further including an inlet door rotationally positioned to sealingly engage with the inlet port and configured to selectively rotate between at least a first position on the ground and a second position, for in flight RAM air to the APU. An actuator is coupled to the inlet door and mounted to an exterior surface of an aft portion of the inlet duct. The actuator is configured to provide access to the actuator via the APU compartment and provide symmetrical door loading without impacting the flow passage while rotating the inlet door to at least the first position and the second position.

Other independent features and advantages of the preferred inlet door assembly will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description of the various embodiments, it is to be appreciated that the air inlet assemblies described below may be used in conjunction with various types of gas turbine engines, such as an aircraft turbofan jet engine, and various types of aircrafts, watercrafts and ground-based installations. The skilled artisan will appreciate that, although the present invention is, for convenience of explanation, depicted and described as being implemented in the context of an auxiliary power unit, it will be appreciated that it can be implemented with other sections of an engine as well. Additionally, as used herein, like numerals refer to like parts.

Figure 1:
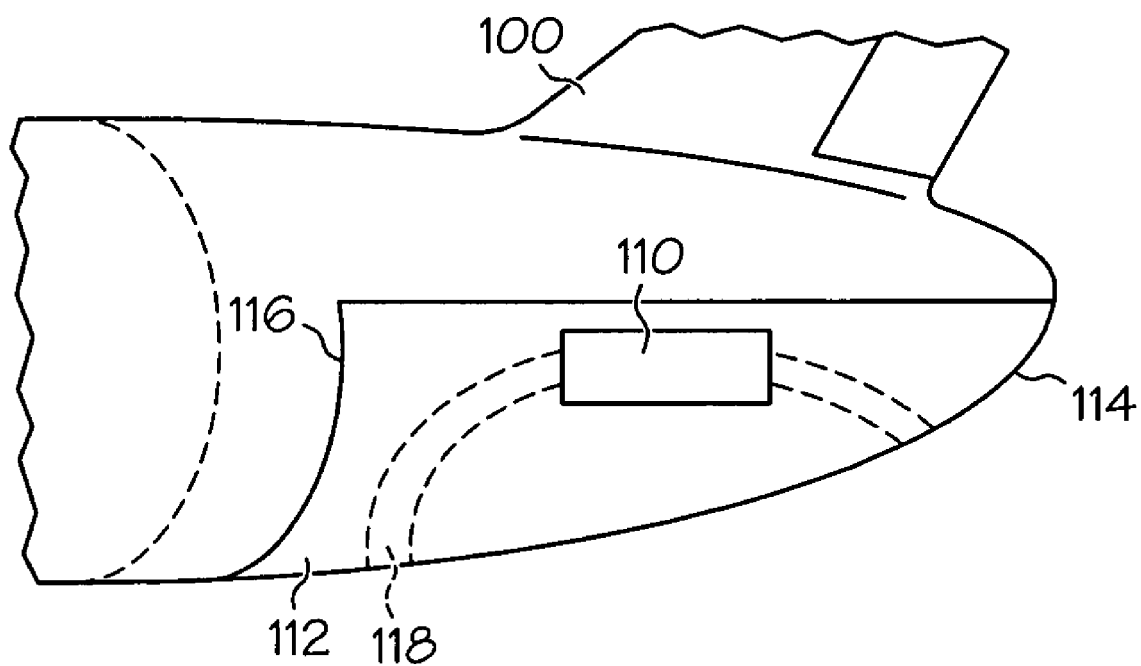
FIG. 1 is a cross-sectional schematic showing an auxiliary power unit (APU) mounted in the tailcone of an airplane.

Turning now to the description and with reference first to FIG. 1, a cross-sectional schematic of an auxiliary power unit (APU) 110 is shown mounted in the tailcone of an aircraft 100. The aircraft 100 includes a compartment 112 that is defined by the aircraft exterior surfaces 114 and a firewall 116. The exterior surface 114 includes an intake opening 118 that communicates with the APU 110 via an inlet duct 120 (shown in FIG. 2). Although the inlet duct 120 and intake opening 118 are shown positioned on the underside of the aircraft 100, it will be appreciated that both may be located anywhere on the aircraft 100 depending on the aircraft configuration. The firewall 116 separates the compartment 112 from the rest of the aircraft fuselage. The APU 110 is disposed within the compartment 112.

Figure 2:
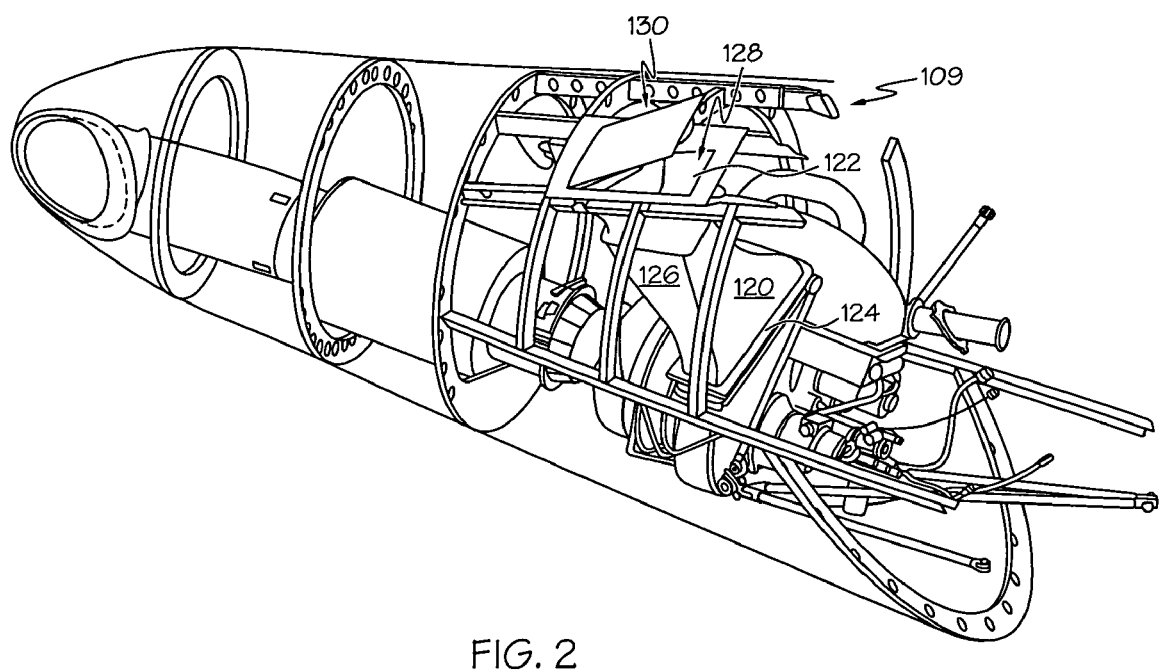
FIG. 2 is a perspective view of the inlet duct portion of an exemplary gas turbine APU.

With reference to FIG. 2, illustrated is an inlet door system 109, and more particularly an inlet duct portion of the exemplary gas turbine APU 110 of FIG. 1. The inlet duct 120 includes an inlet port 122, an outlet port 124, and a sidewall 126 that defines a flow passage 128 through which the air passes and an inlet door assembly 130 that is mounted thereon. The amount of air that is ingested is controlled by the inlet door assembly 30. The inlet door assembly 130 also controls the direction of noise that propagates from the APU 110 to the ambient environment.

Figure 3:
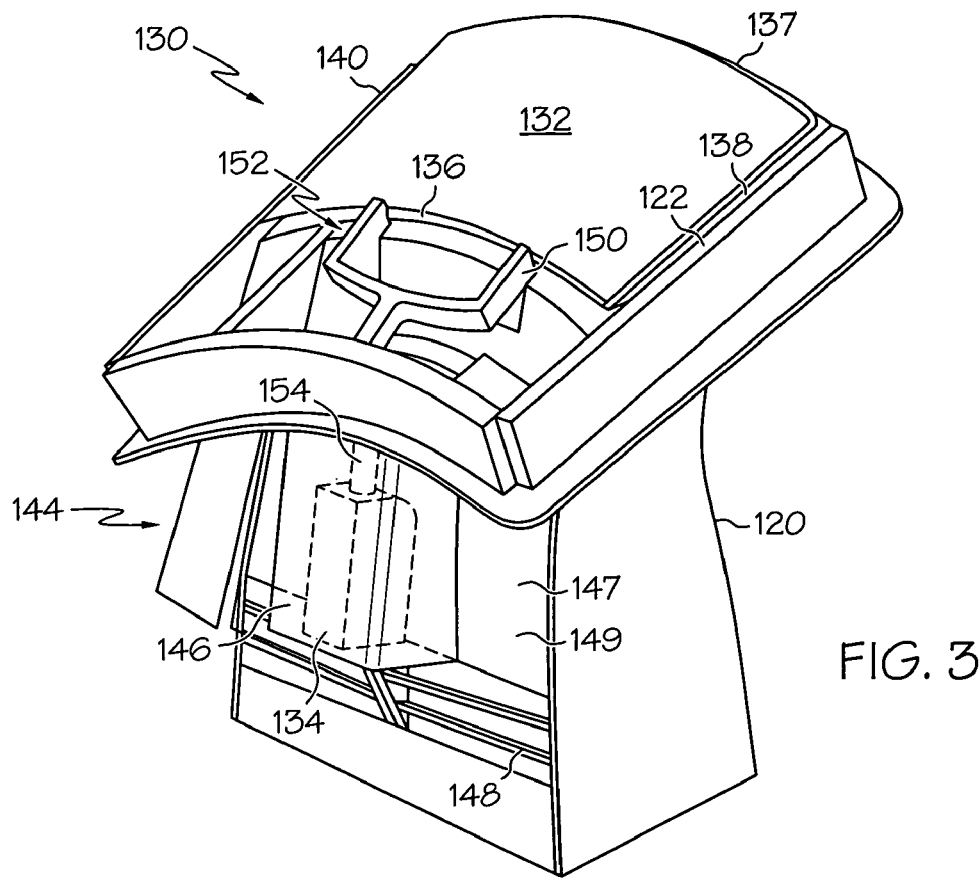
FIG. 3 is a perspective rear view of the APU inlet duct having an inlet door assembly mounted thereon, including an exemplary aft inlet duct mounted actuator.
Figure 4:
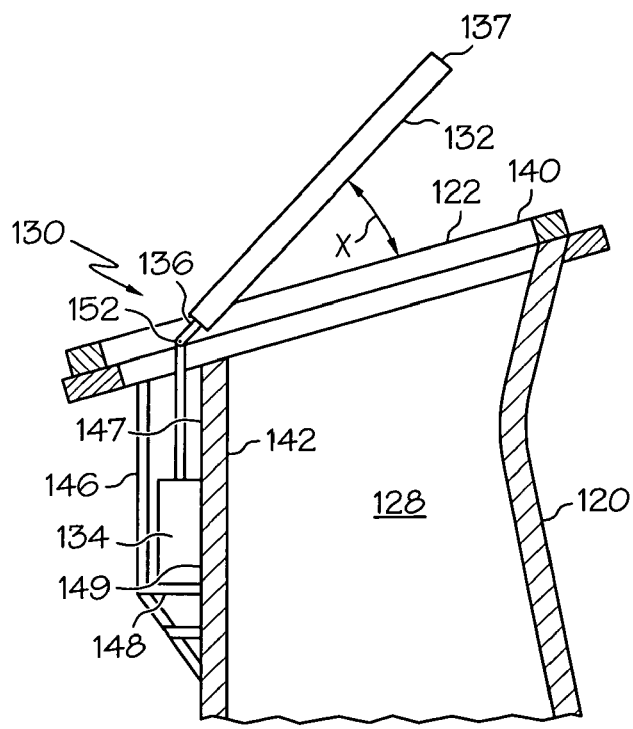
FIG. 4 is a schematic sectional view of the APU inlet duct having the exemplary aft inlet duct mounted actuator of FIG. 2 mounted thereon.
Figure 5:
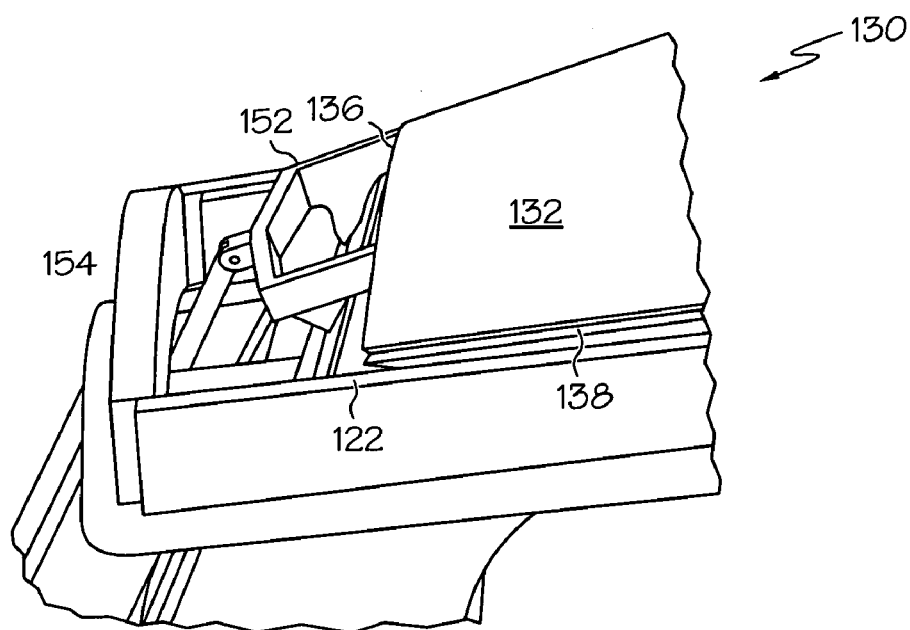
FIG. 5 is a perspective view of a portion of the inlet door assembly shown in a closed position and including the exemplary aft inlet duct mounted actuator.
Figure 6:
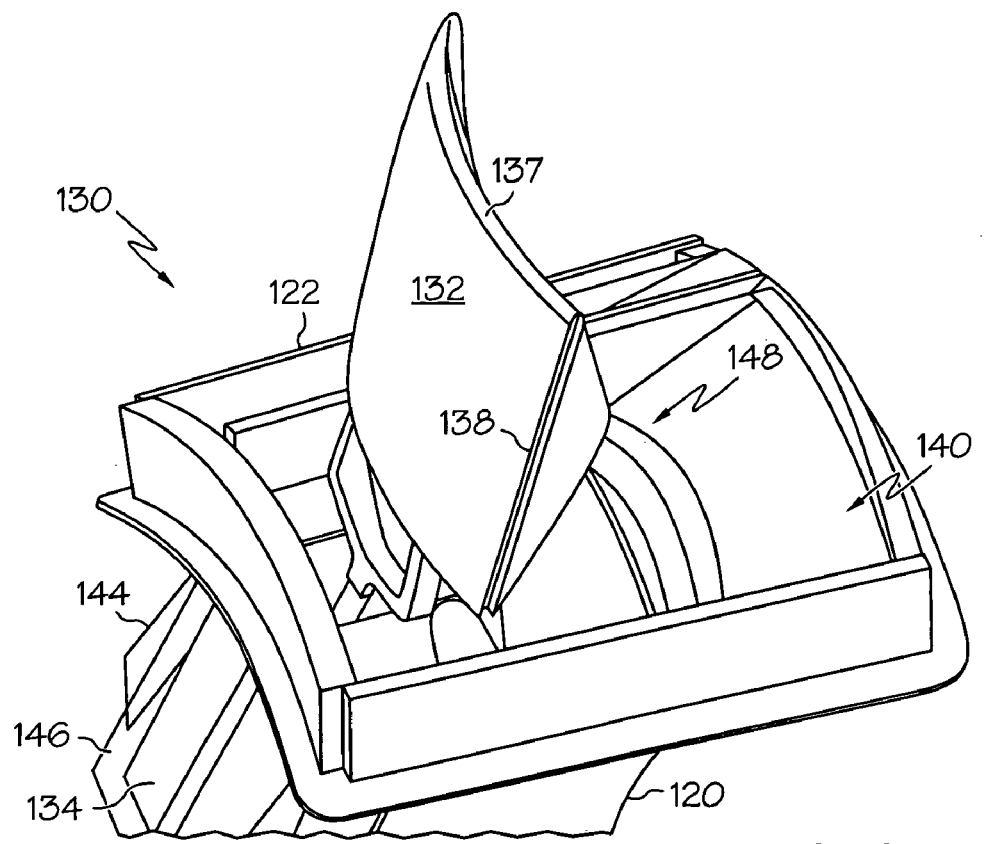
FIG. 6 is a perspective view of a portion of the inlet door assembly shown in an open position and including the exemplary aft inlet duct mounted actuator.

Referring now to FIGS. 3-6 the exemplary inlet door assembly 130 is depicted and is coupled to the inlet duct 120. The inlet door assembly 130 generally includes a door 132 coupled to an aft inlet duct mounted door actuator 134. The door 132 preferably includes first and second sides or ends 136, 137 and a seal 138 that is configured to sealingly couple the door 132 to an inlet opening 140 when the door 132 is in a closed position. The door 132 is coupled to the inlet duct 120, such that at least a portion of the door 132 is rotatable between at least two positions, for example, a first position and a second position. The door 132 is rotatable so that sufficient ambient air is allowed into the inlet duct air flow passage 128 when desired, while APU noise is reduced. In the illustrated embodiment the door 132 is rotationally mounted to the aft inlet duct mounted door actuator 134. Alternatively, the door 132 may be mounted to the outlet port 122, a sidewall 142 of the inlet duct 120, such as by rotationally mounting the door 132 to an exterior surface of the inlet duct 120, or mounted to the aircraft 100. The aft inlet duct mounted door actuator 134 is configured to move the door 132 between a first or closed position as best illustrated in FIGS. 3 and 5, in which at least a portion of the door 132 deflects the APU air flow in a first direction, and a second or open position as best illustrated in FIGS. 4 and 6, in which at least a portion of the door 132 deflects the air flow in a second direction. Alternatively, the aft inlet duct mounted door actuator 134 may be configured to first raise the door 132 away from the aircraft exterior surface 114 and then rotate the door 132. The aft inlet duct mounted door actuator 134 may be any type of commonly known actuator capable of moving the door 132 depending on the inlet door assembly configuration. For instance, the aft inlet duct mounted door actuator 134 may be a linear or rotary actuator.

In this particular embodiment, the inlet door assembly 130 includes a structural bracket 148 that may be formed separately from the inlet duct 120 or formed integral therewith. The structural bracket 148 provides structural support for the mounting of the aft inlet duct mounted door actuator 134 to an exterior surface 147 of an aft portion 149 of the inlet duct 120. The positioning of the structural bracket 148 on the exterior surface 147 of the exterior aft portion 149 of the inlet duct 120 and mounting of the aft inlet duct mounted door actuator 134 thereto, minimizes any impact on the available acoustic area inside of the inlet duct 120 and any effect on the aerodynamic performance of the inlet system. The inlet door assembly 130 further includes a compartment cooling duct 144 and an optional fire proof cover 146 positioned to substantially enclose the aft inlet duct mounted door actuator 134.

In the embodiment depicted herein, the inlet door assembly 130 includes the aft inlet duct mounted door actuator 134 coupled to the door first side 136. A coupling mechanism 150, such as a screw, clamp, or other type of mechanism is configured to rotationally couple the door 132 to the aft inlet duct mounted door actuator 134. More specifically, the aft inlet duct mounted door actuator 134 may include an aft lever arm 152 formed at a distal end of an actuator extension rod 154, to which the door 132 is coupled via the coupling mechanism 150. The aft inlet duct mounted door actuator 134 is in communication, either electrically, pneumatically, or hydraulically, with a control circuit, an electronic control unit (ECU), or any one of numerous other types of control mechanisms (not shown) that are configured to communicate door position commands to the aft inlet duct mounted door actuator 134. In the illustrated embodiment, the aft lever arm 152 is in the form of a forked component that provides symmetrical door loading during opening and closing of the door 132. During actuation, the door second side 137 preferably rotates between 0 degrees and +90 degrees, relative to the aircraft exterior surface so that sufficient ambient air is allowed into the inlet duct air flow passage 128 when desired, while APU noise is reduced. The aft inlet duct mounted door actuator 134 operates by pushing and pulling on the extension rod 154 in conjunction with the aft lever arm 152 to rotationally open and close the door 132. The mounting of the aft inlet duct mounted door actuator 134 on the aft portion 149 of the inlet duct 120 thereby permits the actuator extension rod 154 to operate without obstructing the inlet duct air flow passage 128 and impacting aero dynamic performance. In addition the mounting of the aft inlet duct mounted door actuator 134 on the aft portion 149 of the inlet duct 120 provides for the aft inlet duct mounted door actuator 134 to be readily accessible via the APU compartment 112 for maintenance and/or replacement.

As noted above, FIGS. 3 and 5 illustrate the door 132 of the inlet door assembly 130 in a closed position and FIGS. 4 and 6 illustrate the door 132 in an open position. The closed position is typically used while the APU is not in operation, and the full-open position is typically used while the aircraft is on the ground and allows noise to propagate directly out of the inlet duct 120 minimizing deflection forward the aircraft, the door is in an intermediate open position in flight to provide a RAM effect for APU inlet recovery and APU compartment cooling. When the open position is desired, the control circuit (not shown) communicates the desired position to the aft inlet duct mounted door actuator 134, which then actuates the door 132 to a desired angle "x" relative to the aircraft exterior surface 114 (see FIG. 4). The outward position may be used to achieve RAM air recovery while minimizing aircraft drag when the aircraft is in flight. Additionally, when the aircraft is taxiing on the ground, the outer surface of the door 132 acts as a shield to deflect foreign objects from the inlet duct 120 and prevent damage thereto.

When the APU is not operating, such as during portions of flight, the inlet duct 120 is closed, as shown in FIGS. 3 and 5. The door 132 is preferably in a closed position to lower aircraft drag. When the door 132 is actuated from the open position shown in FIGS. 4 and 6 to the closed position, the control circuit (not shown) communicates to the aft inlet duct mounted door actuator 134 to close the door 132 by causing the door second side 137 to rotate until the door 132 is flush against the aircraft exterior surface 114. Most preferably, the door 132 and the inlet duct 120 sealingly couple to one another so that foreign objects do not enter into the inlet duct 120 to damage the APU.

As best illustrated in FIGS. 3, 5 and 6, the mounting of the aft inlet duct mounted door actuator 134 to the exterior surface 147 of the aft portion 149 of the inlet duct 120 allows for access to the aft inlet duct mounted door actuator 134 from inside the APU compartment 112. In addition, positioning of the aft inlet duct mounted door actuator 134 on the aft portion of the inlet duct 120 minimizes the door frame cut-out in the aircraft exterior surface, as compared to a side actuated door.

Thus, an improved inlet door assembly has been provided that is configured to provide for aft inlet duct mounting of the door actuator 134. The mounting of the aft inlet duct mounted door actuator 134 on the exterior surface 147 of the aft portion 149 of the inlet duct 120 minimizes any impact on aerodynamic performance of the door. In addition, because the actuator 134 is mounted on the exterior surface 147 of the aft portion 149 of the inlet duct it does not impact the inlet duct air flow passage 128, and thereby minimizes impact on the available acoustic area on the interior of the inlet duct 120. Furthermore, by mounting the actuator 134 in this manner, it provides for accessibility to the actuator 134 via the APU compartment.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An inlet door system providing RAM air to an auxiliary power unit (APU) and APU compartment contained within an aircraft, the inlet door system comprising:
    a duct configured to extend from the auxiliary power unit (APU) to an intake opening formed in an outer surface of the aircraft, the duct having an inlet port, an outlet port, and a duct sidewall extending from the inlet port to the outlet port, the duct sidewall defining an air flow passage therebetween the inlet port and the outlet port;
    a door having a first end and a second end, the door rotationally coupled at the first end to the duct sidewall and positioned to sealingly engage with the inlet port and configured to selectively rotate between at least a first position and a second position; and
    an actuator mounted to an exterior surface of an aft portion of the duct and including an extension rod, the extension rod coupled to the first side of the door, the actuator configured to push and pull on the extension rod to thereby rotate the door to at least the first position and the second position, respectively, without the actuator, the extension rod, nor any other structure connected to both the actuator and the door, extending into the air flow passage.

2. The inlet door system of claim 1, further comprising a forked component coupled between the extension rod and the first side of the door, the forked component configured to provide symmetrical door loading.

3. The inlet door system of claim 1, further including a mounting bracket to mount the actuator to the aft portion of the duct.

4. The inlet door system of claim 1, wherein the actuator is a linear actuator.

5. The inlet door system of claim 1, wherein the actuator is located to provide maintenance access thereto via the APU compartment.

6. The inlet door system of claim 1, wherein the actuator is configured to selectively raise and lower the door to deflect APU noise within the air flow passage.

* * * * *